United States Patent [19]

Conners

[11] 4,442,786
[45] Apr. 17, 1984

[54] FISHING VESSEL

[75] Inventor: Craig Conners, San Diego, Calif.

[73] Assignee: Capt. Conners Inc., D.C.

[21] Appl. No.: 377,272

[22] Filed: May 10, 1982

Related U.S. Application Data

[63] Continuation of Ser. No. 170,226, Jul. 18, 1980, abandoned.

[51] Int. Cl.³ ............................................. B63B 35/14
[52] U.S. Cl. ...................................... 114/255; 43/6.5; 43/14
[58] Field of Search ................... 114/255, 151; 43/6.5, 43/8, 14

[56] References Cited

U.S. PATENT DOCUMENTS

| | | | |
|---|---|---|---|
| 1,363,424 | 12/1920 | Matheson | 43/14 |
| 3,091,879 | 6/1963 | Puretic | 43/6.5 |
| 3,481,065 | 12/1969 | Whaley | 43/8 |
| 3,598,078 | 8/1971 | Baer | 114/151 |
| 4,175,347 | 11/1979 | Puretic | 43/6.5 |
| 4,281,767 | 8/1981 | Carpenter | 114/255 |

FOREIGN PATENT DOCUMENTS

| | | | |
|---|---|---|---|
| 54605 | 3/1967 | German Democratic Rep. | 114/255 |
| 52-31495 | 3/1977 | Japan | 114/151 |
| 55-36124 | 3/1980 | Japan | 114/255 |
| 1484246 | 9/1977 | United Kingdom | 43/14 |

OTHER PUBLICATIONS

*World Fishing*, vol. 18, No. 6, Jun. 1969, p. 51.
High, William L., "Puget Sound Drum Seining", in Marine Fisheries Review, Dec. 1974.

*Primary Examiner*—Trygve M. Blix
*Assistant Examiner*—Thomas J. Brahan
*Attorney, Agent, or Firm*—Sughrue, Mion, Zinn, Macpeak & Seas

[57] ABSTRACT

An oceanic fishing system on a ship having a main propulsion system and an auxiliary bow thrustor providing forward as well as lateral thrust. The ship was a stern working deck with a net deploying and retrieving drum disposed on the working deck and positioned to transfer a purse-seine net over the stern of the ship. Overhead booms attach and selectively move a free and of the purse-seine net relative to the stern. A brailing crane is disposed on the stern working deck with an extensible arm over the stern to brail fish from the net. And onboard fish handling system receives fish from the brailing crane and transports them for processing and onboard storage.

14 Claims, 8 Drawing Figures

FISHING VESSEL

This is a continuation of application Ser. No. 170,226, filed July 18, 1980, now abandoned.

BACKGROUND OF THE INVENTION

This invention relates to a vessel for oceanic fishing and a method of fish handling from entrapment through on-board processing.

This invention finds particular utilization in the area of off-shore fishing of tuna and similarly large fish which are found in quantity in large schools. Such schools of fish are presently captured utilizing five well known techniques. They are, longline, pole and line, purse-seine, trailing and traps. Longline fishing generally utilizes a series of hooks, on the order of 2,000 attached by leader wires to a very long main line which may be in the range of approximately 50 miles. At the beginning of each fishing day, the hooks are manually baited utilizing fish (saury), and the main line together with its leaders and hooks, attached at uniformly spaced intervals is let out while the vessel steams through the potential fishing waters. The main line is selectively ballasted so that it is placed at the subsurface location of the feeding grounds of large, deep swimming tuna (generally approximately 50 fathoms). With this type of system, only one set and retrieval of the gear is made by the fishing vessel during each working day. As is appreciated, this technique is arduous and relies heavily on manual labor.

The second technique, pole and line, have been employed extensively when used in conjunction with small fishing vessels. Essentially, vessels of this type carry live bait which is thrown to a attract surface schools of tuna which are subsequently hooked and brought on board.

Purse seining utilizes a long, deep wall of webbing to encircle surface schools of tuna. The net is set in approximately a circular area (subject to current and wave action) and then by drawing a purse line, the opening at the bottom of the net is reduced in area so that an escape route for the fish under of the net is eliminated. The net is then drawn aboard ship further reducing its size and concentrating the fish into a continually decreasing volume. Various techniques are utilized to recover the net and transfer the fish from the net onto the vessel. One technique which is commonly used is disclosed in U.S. Pat. No. 3,091,880 describing the well known technique of utilizing a power block for purposes of net handling and fish transfer.

Another technique of net handling is the so-called "drum seining method" which has been the subject of use on smaller coastal vessels for salmon fishing. Techniques of drum seining are summarized in detail in "Marine Fisheries Review", Vol. 36 No. 12, Dec. 1974, paper 1105, "Puget Sound Drum Seining", by William L. High. Drum seining techniques do not require the use of power blocks to lift the net over and onto the deck. They generally rely on a drum which is disposed on the stern of the vessel which may be rotated for operation either at the vessel side or transom. Also, although not directed to drum seining per se, the technique of net setting and retrieval in such systems utilizing pivoting drums is disclosed in U.S. Pat. No. 3,938,274.

In such systems the net is initially unwound from the drum at a controlled rate while the ship circumscribes a wide circle approximately the same circumference as the length of the net. A power skiff is deployed from the vessel and is used to hold one end of the net by means of a tow line during this laying operation. Positive floation keeps one edge of the net at or near the surface while ballast carries the lower edge to a desired depth. The circle is complete when the tow line initially carried by the skiff is brought back to the fishing vessel. A pursing line which extends as a cord across a portion of the bottom edge of the net is then drawn so that the net is "pursed" or drawn upward along its bottom edge to prevent the fish from escaping by diving below the net. As the pursing operation continues the overall circumference of the net is decreased the trap the fish. The drum is them again actuated to pull the net toward the vessel with the skiff disposed opposite the vessel to hold the net away from the vessel. That is, since the drum is drawing the net toward the vessel, in these prior art systems, the vessel will at the same time be drawn inexorably toward the net by operation of the drum. To prevent the net from fouling, the skiff is positioned, on station at an opposite point on the circumference of the net and holds it away from the vessel.

As the circumference of the net is reduced, near the vessel various techniques are utilized in the prior art to separate (brail) the fish from the net. U.S. Pat. No. 3,938,274 shows one unconventional technique utilizing a suction device placed amidships so that the fish are drawn into the vessel. More conventional techniques utilize baffles of the like to strip the fish from the net as it is drawn onto the vessel.

Once onboard the ship the fish may be frozen, and stored in holes until the fishing operations are complete and the vessel returns to port.

The ability of such vessels to operate efficiently and in unfavorable environmental conditions off-shore is a continuing requirement for increasing the capability of such fishing operations. Commercial fishing is very cost sensitive and time spent off-shore until the holds are full should be minimized. Efficient techniques to permit completion of the fishing task in a reduced time frame lower costs, allows the vessel to make more trips and improve profits. The use of drum seiners represents a considerable improvement over traditional power block systems in terms of the time to make a set of the net. However it has been generally used only on small coastal craft. Reduction in net setting time is deemed to be an important criteria since the greater number of sets that can be made on a run of fish, the greater the production and hence increased profitability. For example, traditional power block operations on conventional tuna vessels have the capability of making approximately 4 or 5 net sets in one 24 hour work day. Drum seiners allow about 10 sets in the same time period and offer increased flexibility since pursuing may occur with any amount of the drum set whereas, in power block systems the entire net must be discharged in order to purse the set. However, to date drum seiners have not been used in off-shore operations.

Additionally, in prior art systems whether they be power block operations or drum seiners, utilize a skiff to position and hold the net. The use of the skiff introduces an element of risk since this small boat cannot be safely discharged or retrieved from the fishing vessel in rough weather. Also, the working positions of personnel aboard the skiff are unsafe since they are continuously reaching over the side of the boat to retrieve and hold portions of the net. In rough or choppy water this operation is inherently dangerous. Another safety factor which has given rise to accidents in prior art systems particularly power block operations is that net retrieval and separation of fish from the net is done by positioning the net overhead the working deck by means of booms and the like, for example as shown in U.S. Pat. No. 3,091,880. As a result, material dropping out of the net, falling fish, sticks, or the like can strike and injure crew. Additionally, severe stings from jellyfish chemicals which tend to drop out of the net into the eyes and face of crewmen looking upward is an occupational hazzard. Moreover, broken purse rings and the like may fall as the net is retrieved during power block operations. Accordingly, prior art systems utilizing power blocks located on overhead booms have presented severe problems with respect to occupational hazzards.

Commercial tuna fishing utilizing prior art systems is as briefly mentioned, a labor intensive operation in addition to having severe operational constraints thereby inhibiting efficiency. Power block operations require crew to man the skiff, separate fish from the net, and manually haul portions of the net onto the vessel. While drum seining systems have reduced manpower requirements compared with power block operation, such prior art systems are still labor intensive in terms of crew requirements for skiff operations and brailing by hand.

Another operational aspect of off-shore fishing that is labor intensive is the handling of fish once onboard. Traditional systems require manual fish transport from the receiving area on deck and placement of fish in appropriate holds for storage. In the context of systems operating at approximately 50-75 tons of fish per hour the labor requirements are severe.

SUMMARY OF THE INVENTION

Given the defects in prior systems, it is an object of this invention to define an integrated off-shore fishing operation.

It is another object of this invention to improve drum seining techniques by placement of a drum at the stern of the vessel and eliminate the requirement for a skiff during net setting and pursing operations.

Another object of this inventiion is to eliminate net backlash or wrap around the bottom side of the drum during discharge operations.

A further object of this invention is to define a novel fishing vessel for off-shore commercial fishing utilizing bow thrustors for positioning the vessel during pursing and brailing operations.

Yet another object of this invention is to define a novel mechanical system of brailing utilizing a fish brailing crane disposed on the stern of the vessel to remove the catch from the pursed net.

An additional object of the present invention is to define an integrated on-board fish handling system utilizing conveyers to process fish from the mechanical brailer to deep freeze wells at rates compatible with the loading of fish on board the vessel.

A further object of this invention is to reduce the manpower requirements for off-shore fishing vessels by the use of drum seiners and mechanical brailing to improve fish retrieval operations more safely and efficiently in rough weather conditions.

These and other objects of the present invention are attained by a novel off-shore fishing vessel utilizing drum positioned at the stern of the vessel for drum seining. The use of a large skiff for positioning and maintenance of the net during operations is eliminated by the use of the sea anchor positioning the net during discharge operation from the drum. As the net is unrolled, the ship proceeds to circumscribe a large circle. In order to reduce the tendency of backlash or wrapping the net around the bottom side of the drum during discharge operations a bar of water jets or the like near the bottom of the drum are employed to properly position the net as it is unrolled from the drum. When the net has been fully discharged the set end is retrieved by means of a running rope and pursing operations begin utilizing a purse winch. During pursing operations bow thrustors are employed to position the vessel vis-a-vis the net. All manpower is confined within the vessel itself and no skiff is required. The bow thrustor operation continues as the net is hauled by means of the net drum in association with spooling gear and a stern roller. As hauling continues the net is "dried up" and then rolling is stopped. Brailing is then accomplished by use of an hydraulic brailing crane which is installed on the bulwark top of the stern. The hydraulic crane is equipped with a brailing net having its own pursing line and operates to brail in a motion working away from the operator. One operator operates the crane from an elevated position having visibility to water level. The brailing crane has sufficient swing to facilitate removal of fish from the net and swing over the deck, over the net that has been hauled and deposit fish into a hopper.

Once deposited into the hopper the fish are mechanically transported by means of a conveyer to an unloading station where they are initially processed and sorted. Initial processing may include ecivcarating, removal of heads and tails and placement in plastic bags for vaccum freezing. The thus processed fish are deposited into hopper where they are transported to the main deck of the vessel for placement in appropriate wells. Fish are transported on the main deck by means of either a pivotable nozzle for discharged into aft-wells or for placement onto a conveyer system running longitudinal where the fish are then moved into position relative to wells to be filled. In each of the storage wells contains brine which is maintained at low temperature by freezing coils and fish are deposited into the wells and then stored to assure thorough freezing. Once the well is filled and initial freezing of the fish has occured, spraying of the brine remaining in the well together with refrigerant coils located therein maintains the temperature in an acceptable freezing range. The fish thus frozen are stored until the vessel returns to port. The frozen fish are unloaded from the wells by pumping brine into each well to float the stored fish to a hatch. As each well is emptied the brine is pumped to a successive well to float the fish stored therein. This specific technique of unloading is known in the art. However, the vessel in accordance with this invention uses a novel conveyer system to transport the fish internally to the unloading hatch.

This invention will be described with reference to the drawings and the description of the preferred embodiment which follows.

DESCRIPTION OF THE PREFERRED EMBODIMENT

Figure 1:
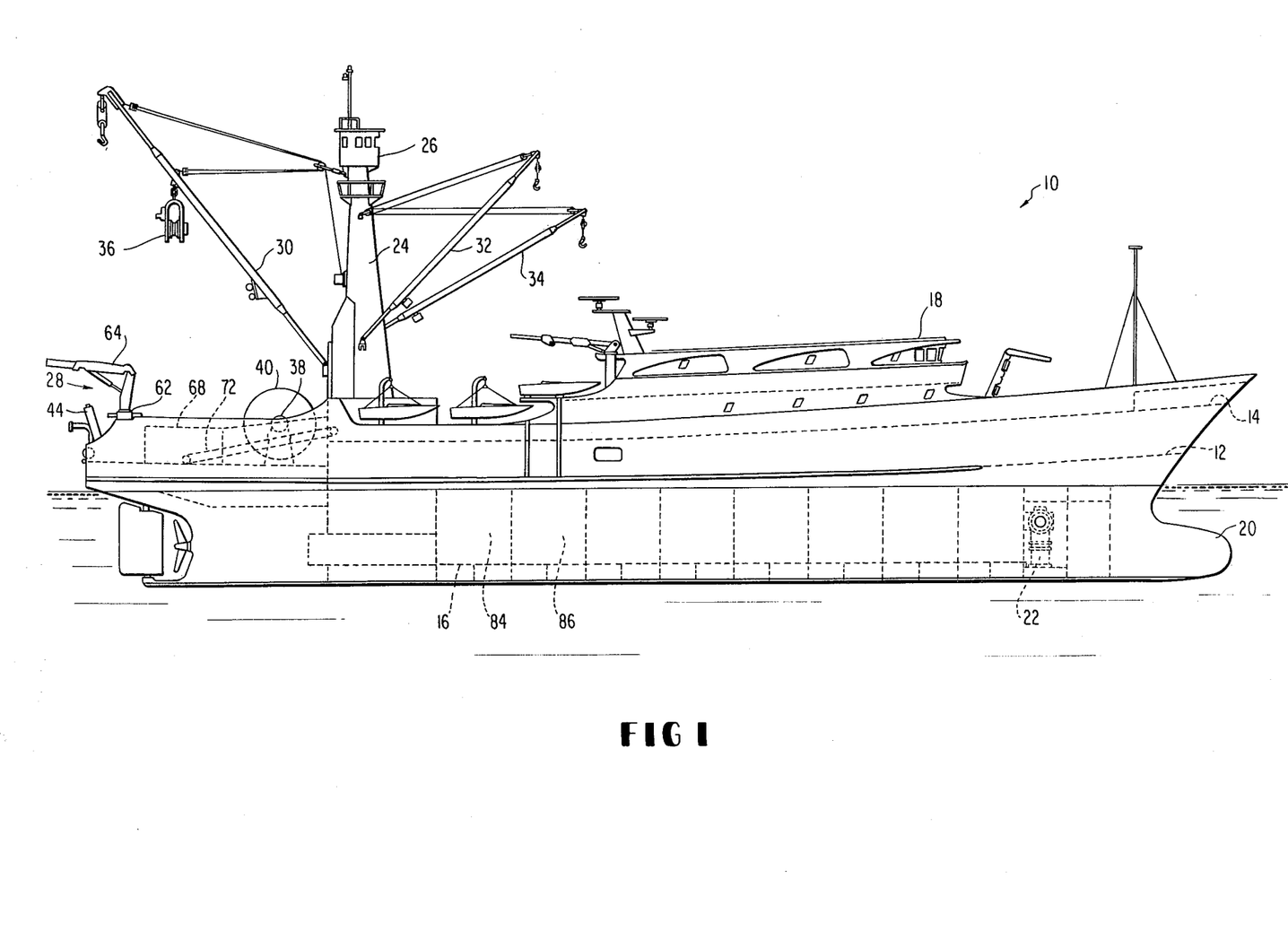
FIG. 1 is a side elevation view of the off-shore fishing vessel in accordance with the present invention.

Referring to FIG. 1, in accordance with the present invention the off-shore fishing vessel constructed in accordance with the teachings herein incorporates not only novel drum seining techniques but also has conventional structure for backup power block operations. The power block system is shown for purposes of completeness but forms no part of the invention. The vessel 10 comprises a hull having a main deck 12, an upper deck 14, a hold level 16 and bridge deck supper structure 18. The vessel has a power plant, screw, and steering mechanism as shown. At the bow end of the vessel a bow wave suppresser 20 is operably disposed and configured to suppress bow waves when the vessel is running to improve optimum cruising speed. The bow end also incorporates a bow thrustor 22. The bow thrustor is utilized during pursing and net retrieval operations to position the vessel relative to the deployed net.

Figure 4:
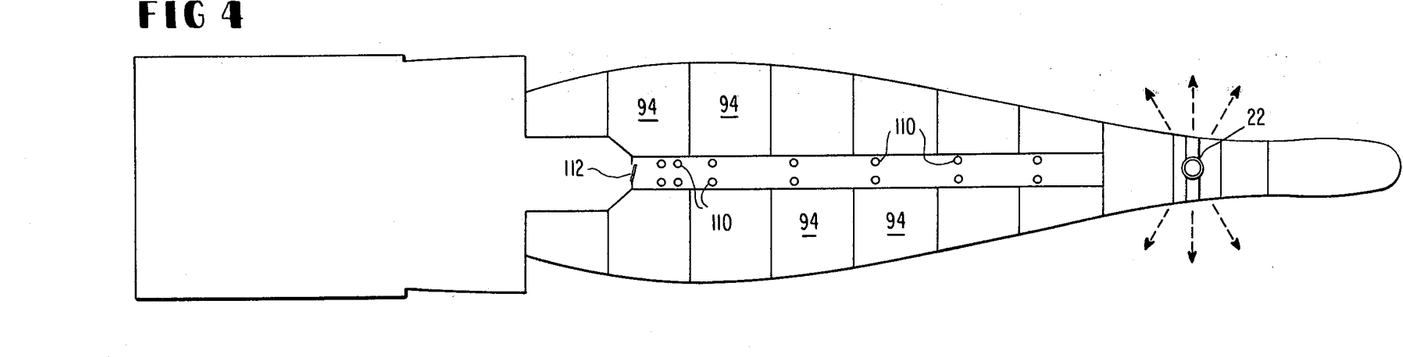
FIG. 4 is a top view or portion of the hold deck of the vessel shown in FIG. 1.

As shown in FIGS. 1 and 4 the bow thrustor 22 is positioned on the center line of the vessel below the water line to provide positive control of the bow by thurst of high velocity water jets which are selectively discharged from either the port or starboard side. Although not shown, the thrustor may be located above the waterline and still operate acceptably. A suitable design is OMNITHRUSTER Model JT-800 modified so that the bow thrustor is capable of producing forward thrust as well as side thrust. The requirement for forward thrust is unique to off-shore fishing vessels during net retrieval to counter the force of the drum tending to pull the ship astern. The thrustor is operable by control located either on the bridge deck 18 or an auxiliary location on the main deck stern operating area for positioning purposes during pursing and net retrieval. The bow thrustor generally utilizes a jet pump driven by either one of the ship's engines or an auxiliary engine to draw water from a suction inlet through the ship's underside and then by appropriate vanes direct high pressure water through a selected outlet to produce the desired thrust magnitude of direction. The arrows in FIG. 4 illustrate the directions of forward and lateral thrust.

Main mast 24 is installed on the aft end of the raised deck and is fitted with two fishing booms 30 and 32 and unloading boom 34. The main mast has an observation station 26 used to direct fishing operations from the stern 28 of the vessel. The main fishing boom 30 is fitted with a power block 36. Power block 36 is used only in a backup mode for conventional well-known pursing seining techniques using that equipment. However, it is not used in the practice of the fishing technique in accordance with the present invention. The unloading boom 34 may used for unloading fish from the aft side fish hatch onto the dock in situations were tide variations effect the relative position of the ship to the dock. Booms 30-34 are operated by appropriate block and tackle and carry the necessary fittings (not completely shown) in terms of auxiliary vanging and cargo blocks to be used in operation.

Figure 2:
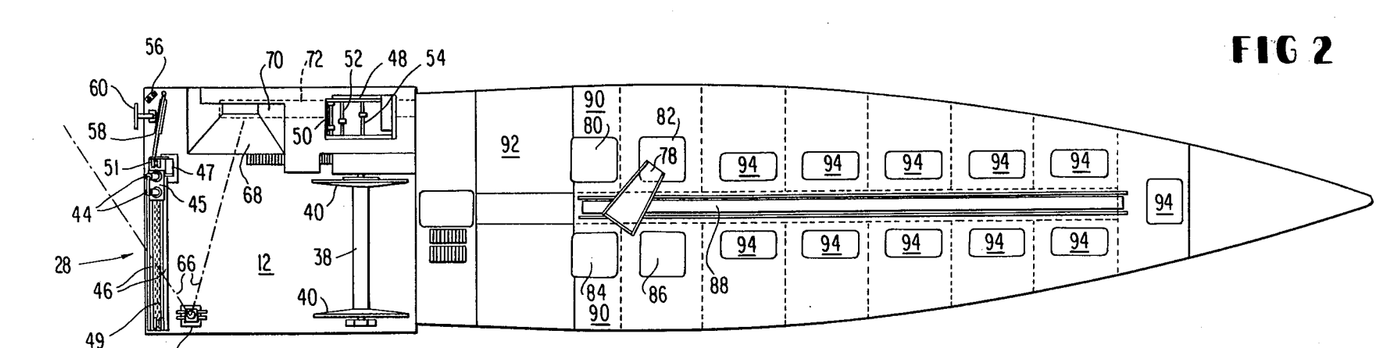
FIG. 2 is a top view of the main deck of the vessel shown in FIG. 1.

Referring now to FIGS. 1 and 2 the stern section of the vessel 10 will be described in detail to delineate those elements employed in fishing operations in accordance with this invention. Net handling is carried out utilizing net drum techniques in association with spooling gear and a stern roller. As indicated, the conventional net hauling system by using a power block 36 can be provided for in an emergency. In either case however operation occurs only at the stern side 28 of the vessel. A net drum 38 is positioned on the main deck 12 and is driven by dissel engine such as a Caterpillar Model 3412 utilizing a torque converter. The drum 38 must be large enough to handle the net and typical dimensions include spool of approximately 3 feet in diameter and 24 feet in length having flanges 40 of approximately 15 feet diameter on both starboad and port sides. The drum is supported by a bulwork assembly with the necessary drive and brake gear incorporated into one side of the bullwork.

At the stern end of the vessel, a level wind roller 44 is placed comprising track section 46 with a center slot allowing the rollers to reciprocate back and forth or be positioned by the operator to wind the net in a uniform and level manner about the drum 38. Rollers 44 act as a guide for the net to pass through to uniformly distribute the net about the drum. The rollers 44 are positioned on a carriage 45 driven by motor 47 winding chain links 49 about sprocket 51.

Purse winch 48 is disposed on the main deck having 3 winding drums 50, 52, 54. One drum is used for winding the net purse line, the second for winding the running rope, to be discussed later and a third winding drum is not used but held is in reserve. In conventional fishing operations utilizing the power block 36 all three winding drums would be used. Fairleads 56 are provided for the running rope and purse line to provide a fairlead to the respective drums on the purse winch. A ring stripper 58, of conventional design such as a Morris Whaley Model B-101H-218 is provided in front of a davit 60 for the purse winch.

Figures 5, 6, 7, 8:
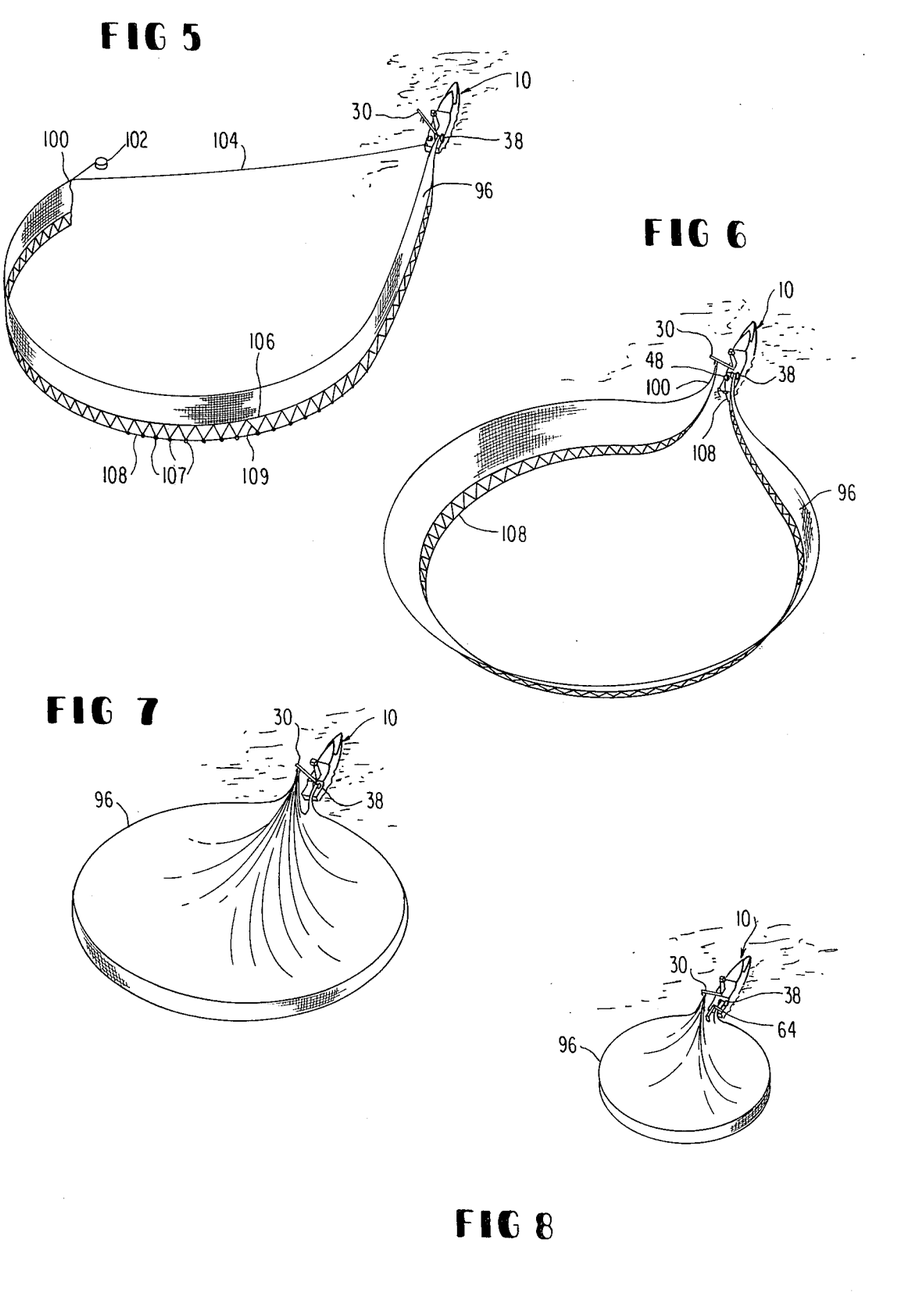
FIGS. 5-8 are diagramatic views showing ship operations.

In accordance with the present invention brailing takes place entirely mechanically and onboard ship. This is in contrast with prior art brailing techniques wherein fish retrieval took place either manually or, in combination with assistance by overhead booms having cables coupled to a brailing hoop and manpower on the skiff. As a departure from those prior art techniques, brailing takes place in accordance with the present invention utilizing a hydraulic crane which is installed on the aft portion of the main deck. The brailing crane 62 has an extensible boom 64 with a maximum arm length extending over the stern with swing room across the deck. The crane 62 is disposed so that the operator has excellent visibility from an elevated seat down to water level to guide a brailing net which is attached to the end of the crane arm. As shown in FIG. 6 line 66 indicates the span of the arm 64 of the brailing crane 62. The arm is moveable to swing over the aft end of the vessel and brail fish from the net which has been gathered into a pouched form during a hiatus in the net drumming retrieval operations. Fish which are scooped from the net from the stern side toward the net end and are then lifted by the crane as arm 64 swings into a position over hopper 68. Net drumming then commences until the net is further gathered, then a subsequent brailing operation takes place.

Figure 3:
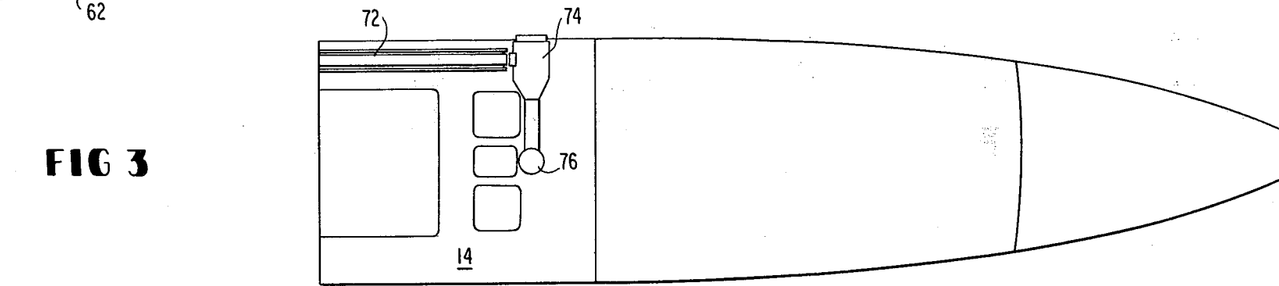
FIG. 3 is a top view or portion of the upper deck of the vessel shown in FIG. 1.

The hopper 68 is disposed on the main deck and provides the input station for reception of the catch onboard the vessel. The hopper is generally funnel shaped having an opening 70 and disposed directly thereunder is a conveyor 72. The conveyor is inclined upward to transport fish deposited in the hopper from the main deck to the upper deck 14. As shown in FIG. 3, the conveyor 72 delivers the fish to a loading hopper 74. The loading hopper 74 performs two functions, (1) an input station for further onboard processing of fish and (2) as a transfer point during fish unloading. Fish transported along conveyor 72 are deposited into hopper 74 and then dropped down chute 76 where they are directed by means of a funnel 78 into temporary storage tanks 80, 82, 84, and 86. Funnel or nozzle 78 is pivotable direct fish into either of the four holding tanks or, as will be explained in detail herein to deposit fish along a second conveyor 88 which is located on the main deck. The area on the main deck 12 continuous with temporary holding tanks 80-86 is used for fish processing operations which will be explained in detail herein. Immediately aft processing area 90 is an antirolling tank 92 which can be filled with sea water ballast to prevent the ship from rolling during fishing operations.

Also disposed on the main deck 12 on either side of the conveyer 88 are a series of fish wells for storing the frozen catch. While six of such wells are shown, this is only for purposes of illustration and is not deemed to be limiting of this invention.

OPERATION

Referring now to FIGS. 5 through 8 the method of drum seining in accordance with the present invention will be described. Referring first to FIG. 5 the ship 10 discharges the net 96 by unrolling the net from the drum 38 over the stern. The end of the net 100 has attached thereto a sea buoy 102 and a running rope 104 extends from the end of the net back to the ship. The running rope 104 passes through the roller 56 to the purse winch 48. The ship 10 generally proceeds ahead to form approximately a circle. As the ship proceeds it discharges the net which is bouyed at the top end by means of corks or floats not shown and at the bottom end by means of a weighted line 106 attached to the bottom of the net. The pursing rings 107 are attached by a bridle 109 to the weighted line 106. When the ship has completed approximately one circle, the running rope 104 is drawn into the ship so that as shown in FIG. 6 the circle around the fish is complete. The end 100 of the net has a load distributing member, not shown which is then coupled to a hook on the main fishing boom 30. The running rope is detached from the net load distributing member and the fishing boom 30 is swung to one side of the ship, generally to port to spread the net over the stern of the vessel. Pursing then commences by drawing the purse line 108 into the ship over davit 60 and onto purse winch 48. As pursing commences as shown in FIG. 6 the bottom of the net is drawn closer together thereby preventing an escape route for the fish through the bottom of the net. At the same time, the drum 38 is rotated to begin retrieving the net. As a consequence, the bottom of the net is drawn together while the overall circumference is reduced. Purse rings are handled as the net is recovered by ring stripper 58. Because the boom 30, having one end of the net is held away from the boat, wrapping of the net around the drum takes place in a uniform manner. Rolling is also assisted by means of a level wind device 44 reciprocating or positioned on track 46 to position the net to achieve uniform wrapping on the spool 38.

The operation of pursing and seining utilizing the drum takes place without as in the prior art a skiff positioned on the circumference of the net to hold the net away from the boat. During this operation the bow thrustor 22 is actuated to maintain the ship in a desired orientation relative to the net. For example when operating in an ocean swell condition the ship can be positioned into the swell so that the net exists on the leeward side and therefore away from the ship. Also, the tendency of the net to drift can be corrected by continuely maintaining the orientation of the ship by means of the bow thrustor. The bow thrustor can be coupled into the internal navigation system of the ship so that any heading can be automatically maintained. Optionally, the bow thrustor can be actuated by remote control from the control station located at the aft portion on the main deck.

The pursing operation is completed as shown in FIG. 7 and the pursing rings are placed on the ring stripper 58. Drum rolling continues and the circumference of the net decreases. The main fishing boom 30 is used to hold the net away from the ship so that the net tends to spread over the stern of the vessel. When the circumference of the net is reduced for example as shown in FIG. 8 it tends to take on a generally pouch like configuration aft the vessel. At this point, brailing may begin utilizing the crane 62 to remove fish from the pouch area and deposit them into the hopper 68. Following completion on this brailing phase, drum rolling then continues until the point is reached where the main fishing boom 30 is swung aft to raise the back end of the net upward. This technique is known as "drying up" where the net is drawn up to the surface and progressively taken into the boat to provide better access for fish retrieval during the brailing operation.

In accordance with the invention, the fishing net is constructed in panels which when disposed from the boat generally lie parallel to the stern. Accordingly, when the fishing boom 30 is positioned over the stern end and protruding to one side, the panels tend to spread and form pleats to allow for easy transfer of fish. During the terminal end of the operation as the net is almost entirely wound around the drum 38 to boom 30 can be swung upward lifting the remainder of the net and allowing easy brailing by the crane 62.

Referring now to FIGS. 2, 3 and 4, fishing handling operations onboard the vessel 10 will be discussed. As the brailing operation continues the crane 62 delivers the catch into the hopper 68. The hopper 68 is configured in a funnel shape leading into the opening 70 having disposed thereunder the upwardly inclined conveyor 72. Fish are therefore transported by means of the crane 62 from the net disposed aft the ship onto a mechanical conveyor where they are delivered from the hopper 74 and to nozzle 78 disposed below chute 76. Nozzle 78 is used to direct the fish into one of four holding tanks 80-86. Each of the holding tanks is provided with nets, not shown, for subsequent removal of the catch from the tanks by bunching and raising the nets as necessary. Disposed around the holding tanks is a processing area 90. In the processing area the fish once removed from the temporary storage tank may be eviscerated, their heads and tails removed, placed in a plastic bag and vacuum sealed. The fish may also be bragged whole. The bagged fish may be then placed on the conveyer 88 and deposited in the selected holding wells 94 each containing brine maintained at a temperature in the range of approximately +5° F. to 5° F. The fish are frozen solid in the sealed bags and the wells are maintained at that temperature. In order to facilitate freezing, the bagged fish may be sprayed with brine. Accordingly, in an intermediate processing step fish are temporarily stored in wells 80–86, processed at station 90, delivered along conveyer 88 to well 90 and then frozen and stored in the well until the ship reaches port. Alternatively, if the catch is of such quality, that is, the type of fish that does not require the protective bagging, the fish can be shifted by the nozzle 78 directly onto the conveyor 88 without temporary storage or processing. They can then be frozen in the well without intermediate processing. Typical of this operation would be the type of fish of low quality sent directly to a cannery or to be ground up for fertilizer and the like.

Unloading of fish from the storage wells when the vessel reaches port takes place in a manner well known in this technology. Basically, loading takes place by pumping 25% brine solution into the fish holds one at a time. As a result the stowed fish will float up to the hatches where they may be removed. The use of brine to float fish within storage wells is well known. The fish float up to the main deck level where they are delivered onto the conveyor 88 and then moved to unloading stations. In accordance with this invention conveyor 88 may be moved vertically, lowered for unloading to facilitate fish handling. Fish in wells 94 are moved along the conveyor belt, then placed on a conveyor, not shown and discharged via another conveyor positioned in the area where hopper 74 has beeen removed or unloading purposes. Fish which are stored in wells 80–86 are removed directly by means of the nets.

As shown in FIG. 4, in order to float the fish which are contained in wells 94, a series of brine pumps 110 are placed on the deck in a "pipe alley" hold deck which is separated from the remainder of the ship by means of a water tight bulkhead 112. The wells are then selectively flooded by pumping the 25% brine solution into one well to allow the fish to float upward to the level on the main deck where they are then placed on the conveyor 88 (in its lowered position). When one well is emptied, the brine is pumped out of that well and into the next well to be emptied. Accordingly, by sequential pumping, the wells 94 are emptied of their contents. In order to facilitate transfer, conveyer 88 is adjustable upward or downward relative to the hatches on each of the holds 94. That is, for purposes of loading the hold, the conveyer by hydraulics, not shown, is adjusted upward so that the fish placed on the conveyer from either the processing area 90 or directly from the nozzle 78 can be conveniently loaded onto the conveyer. However, for unloading it is apparent that the conveyer should be lowered to approximately the same level of the hatch so that as a fish float upward, they can easily be removed from the well and placed onto the conveyer.

Accordingly, then by the use of this invention an integrated off-shore fishing and fish handling operation results. Net setting is accomplished without the use of a skiff and therefore all operations are accomplished on-board. This results in a reduction in manpower as well as a significant increase in safety of the operation. Additionally, all fish handling operations occur from the stern of the vessel where handling is done more expeditiously. By use of a net drum, unwinding and retrieval is accomplished much faster than in conventional power block systems. By use of a mechanical brailer transfer of the fish from the net into the hopper is accomplished at much faster rates then utilizing prior art techniques. Because of the elimination of manpower requirements during brailing, additional incremental savings in on-board labor results. Moreover, the system is operable in adverse conditions. Generally, in rough weather release of the skiff for its retrieval is an exceptionally difficlt operation. Crew work either from a skiff or from the side of the vessel is dangerous under such adverse conditions. In prior art systems, operations are usually terminated if the sea state is too rough. However, in accordance with this invention positioning of the net is accomplished solely by control of the vessel utilizing the bow thrustor and accordingly the use of the skiff as in prior art systems to pull the net away from the vessel is eliminated. Accordingly, operations may be continued in weather conditions that would generally force discontinuance of fishing operations utilizing prior art techniques. Moreover, because the overhead power block is motivated, the hazzard of having fish, sticks, or the like discharged from the overhead net is eliminated. In accordance with the present invention the portion of the net which is held overhead is disposed away from the ship and therefore there is no danger from falling objects on the deck. With this invention efficiency of operation is dramatically increased, labor requirements are reduced and the operation occurs in a safer manner.

It is apparent that modifications and changes to this invention can be made without departing from its essential scope.

I claim:
1. An oceanic fishing system comprising;
   a ship having a main propulsion system and an auxiliary bow thrustor, said bow thrustor providing forward as well as lateral thrust;
   a stern working deck;
   a net deploying and retrieving drum disposed on said stern working deck and positioned to deploy and retrieve a purse-seine net wrapped on said drum over the stern of said ship,
   means to attach and selectively move a free end of said purse-seine net relative to said stern,
   a brailing crane disposed on one side of said stern working deck movable over said stern and pivotable into said net to brail fish, said brailing crane having a rigid hydraulically extensible arm urged into said net, said arm pivotable over said stern working deck, and
   fish handling means including a hopper disposed on an opposite side of said stern working deck from said brailing crane receiving fish from said hydraulic brailing crane and transporting them for processing and on-board storage.
2. The oceanic fishing system of claim 1 wherein said deploying and retrieving drum is mounted for rotation on a bullwork affixed to said stern working deck, the axis of rotation of said drum being substantially parallel to the stern of said ship.
3. The oceanic fishing system of claims 1 or 2 further comprising means disposed on the stern for positioning said net for winding in a stable manner on said drum.
4. The oceanic fishing system of claim 3 wherein said means disposed on said stern comprises a guiderail arranged on said stern, rollers mounted for reciprocating movement on said rail and means for moving said rollers, whereby said net passes said rollers and is guided so that by movement of said rollers on said guiderail said net is evenly distributed onto said drum.
5. The oceanic fishing system of claim 1 further comprising winch means on said working deck, and a running rope attaching said free end of said net to said winch.

6. The oceanic fishing system of claim 5 further comprising a purse line associated with said net, said purse line passing through rings disposed at intervals along one edge of said net and, means disposed on the stern of said vessel to hold said rings from said net as said net is wound on said drum.

7. The oceanic fishing system of claim 1 wherein said means to attach and selectively move a free end of said purse-seine net comprises a elevated boom disposed for movement over said working deck and the stern of said ship, said boom moveable vertically and horizontally to raise or lower said free end and position it relative to said vessel.

8. The oceanic fishing system of claim 1 wherein said fish handling means comprises a first conveyor for moving fish from said working deck to a processing area and a second conveyor for transporting said fish from said processing area to a storage well.

9. The oceanic fishing system of claim 8 further comprising chute means for selectively discharging fishing to either said processing area or on to said second conveyer.

10. A method of oceanic fishing comprising the steps of:
deploying a free end of a purse-seine net from a fishing vessel at a deploying location; unwinding said purse-seine net from a drum disposed on the aft end of said fishing vessel as said vessel moves in a generally circular path, said net having a running rope extending from the free end of said net and a purse line extending to said vessel;
drawing said running rope back to said vessel to bring said free end back to said vessel from said deploying location and thereby encircle within said net fish to be caught when said vessel has completed a portion of its circular travel,
pursing said net by drawing said purse line back to said vessel,
winding said net on said drum by drawing said net over the stern of said vessel,
controlling the forward and aft as well as the lateral position of said vessel relative to said net by a bow thrustor during the operations of drawing said running rope, pursing and winding the net, and
brailing the fish from the net and on to the vessel from the stern thereof by operation of an on-board hydraulic crane having a rigid extensible arm movable from a first position aft of said stern and hydraulically urged from said first position into said net to remove fish, said rigid extensible arm pivotable from said first position to a second position on a stern working deck of said fishing vessel to transfer said fish onto said vessel.

11. The method of claim 10 further comprising the step of suspending said free end of said net from a boom after said running rope has been drawn in to said ship.

12. The method of claims 10 or 11 further comprising the step of winding said net onto said drum as said net is being pursed.

13. The method of 12 further comprising the step of shifting said net across the aft end of said vessel before it is wound on said drum to uniformly layer said net on said drum.

14. The method of claim 10 further comprising the steps of transferring said fish from said crane into an on-board hopper and moving said fish by conveyor into storage wells.

* * * * *

UNITED STATES PATENT AND TRADEMARK OFFICE
CERTIFICATE OF CORRECTION

PATENT NO. : 4,442,786

DATED : April 17, 1984

INVENTOR(S) : CRAIG CONNERS

It is certified that error appears in the above—identified patent and that said Letters Patent is hereby corrected as shown below:

IN THE ABSTRACT:

Line 3, change "was" to -- has --,
Line 6, before "ship" change "the" to -- said --,
Line 7, after "free" change "and" to -- end --,
Line 7, after "of" change "the" to -- said --,
Line 8, change "the" to -- said --,
Line 10, after "from" change "the" to -- said --,
Line 10, change "And" to -- An --.

Column 1, line 35, delete "a",
         line 43, delete "of";
Column 2, line 4, change "floa-" to -- flota- --,
         line 14, after "decreased" insert -- to --,
         line 15, change "them" to -- then --,
         line 55, change "pursuing" to -- pursing --;
Column 3, line 12, change "hazzard" to -- hazard --,
         line 16, change "hazzards" to -- hazards --;
Column 4, line 38, change "discharged" to -- discharge --,
         line 41, change "In each" to -- Each --,
         line 45, change "occured" to -- occurred --.
Column 5, line 2, change "diagramatic" to -- diagrammatic --,
         line 16, change "supper" to -- super --,
         line 29, change "thurst" to -- thrust --,
         line 60, after "may" insert -- be --,
         line 61, change "were" to -- where --

UNITED STATES PATENT AND TRADEMARK OFFICE
CERTIFICATE OF CORRECTION

PATENT NO. : 4,442,786

DATED : April 17, 1984

INVENTOR(S) : Craig Conners

It is certified that error appears in the above-identified patent and that said Letters Patent is hereby corrected as shown below:

```
Column 6, line 9, change "dissel" to -- diesel --,
         line 14, change "starboad" to -- starboard --,
         line 15, change "bulwork" to -- bulwark --,
         line 17, change "bullwork" to -- bulwark --,
         line 31, after "but" change "held is" to --is held--
         line 60, delete "and";
Column 7, line 12, after "pivotable" insert -- to --,
         line 25, change "of" to -- to --,
         line 38, change "bouyed" to -- buoyed --,
         line 61, delete "is";
Column 8, line 9, change "uely" to -- ually --,
         line 41, change "to" to -- the --,
         line 44, change "fishing" to -- fish --,
         line 63, change "bragged" to -- bagged --;
Column 9, line 28, change "or" to -- for --,
         line 52, change "a" to -- the --;
Column 10, line 3, change "difficlt" to -- difficult --,
          line 16, change "hazzard" to -- hazard --,
          line 52, change "bullwork" to -- bulwark --;
```

UNITED STATES PATENT AND TRADEMARK OFFICE
CERTIFICATE OF CORRECTION

PATENT NO.   : 4,442,786

DATED        : April 17, 1984

INVENTOR(S)  : Craig Conners

It is certified that error appears in the above-identified patent and that said Letters Patent is hereby corrected as shown below:

```
Column 11, line 11, change "moveable" to -- movable --,
           line 20, change "fishing" to -- fish --;
Column 12, line 11, change "on to"   to -- onto --,
           line 22, change "in to"   to -- into --.
```

*Signed and Sealed this*

*Eighth*   Day of   *January 1985*

[SEAL]

*Attest:*

*Attesting Officer*

GERALD J. MOSSINGHOFF

*Commissioner of Patents and Trademarks*